(12) United States Patent
Baxter et al.

(10) Patent No.: US 9,541,996 B1
(45) Date of Patent: Jan. 10, 2017

(54) IMAGE-RECOGNITION BASED GAME

(71) Applicant: Google Inc., Mountain View, CA (US)

(72) Inventors: Jeffrey Paul Baxter, Brooklyn, NY (US); Richard The, New York, NY (US); Kjell Fredrik Heghammar, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 14/194,209

(22) Filed: Feb. 28, 2014

(51) Int. Cl.
| | | |
|---|---|---|
| *G06F 3/01* | (2006.01) | |
| *A63F 13/00* | (2014.01) | |
| *G06T 11/60* | (2006.01) | |
| *A63F 13/53* | (2014.01) | |
| *A63F 13/26* | (2014.01) | |
| *A63F 13/25* | (2014.01) | |

(52) U.S. Cl.
CPC ............... *G06F 3/012* (2013.01); *A63F 13/00* (2013.01); *A63F 13/53* (2014.09); *G06T 11/60* (2013.01); *A63F 13/25* (2014.09); *A63F 13/26* (2014.09)

(58) Field of Classification Search
CPC ............ G06K 9/00671; G06K 9/00677; G06K 9/00664; A63F 13/53; A63F 13/25; A63F 13/26; G06F 3/12
USPC .................................................. 463/1, 7, 36
See application file for complete search history.

(56) References Cited

U.S. PATENT DOCUMENTS

| | | | |
|---|---|---|---|
| 6,345,111 B1 | 2/2002 | Yamaguchi et al. | |
| 2003/0032484 A1* | 2/2003 | Ohshima ................. | A63F 13/10 463/43 |
| 2004/0104935 A1 | 6/2004 | Williamson et al. | |
| 2009/0161963 A1* | 6/2009 | Uusitalo ........... | G06F 17/30855 382/203 |
| 2011/0029540 A1* | 2/2011 | Ptucha .................... | G06T 11/60 707/748 |
| 2011/0183765 A1 | 7/2011 | Kobayashi et al. | |
| 2011/0221769 A1* | 9/2011 | Leung .................... | G06K 9/469 345/633 |
| 2012/0032977 A1* | 2/2012 | Kim ...................... | G06T 19/006 345/633 |
| 2012/0162254 A1* | 6/2012 | Anderson ............ | H04N 5/2621 345/633 |

(Continued)

FOREIGN PATENT DOCUMENTS

WO     WO2014107681     7/2014

*Primary Examiner* — Jason Skaarup
*Assistant Examiner* — Ryan Hsu
(74) *Attorney, Agent, or Firm* — McDonnell Boehnen Hulbert & Berghoff LLP

(57) ABSTRACT

Disclosed herein are embodiments of an image-recognition based game. In one aspect, a method involves (1) receiving by a computing device an input to initiate a game application, (2) causing the game application to initiate a game, and (3) during gameplay of the game: (a) causing a graphical display of the computing device to display a silhouette object that includes at least a shape of the silhouette object, (b) receiving by the computing device image data of an environment that includes a real-world object, (c) analyzing the image data to determine one or more similarity measures that indicate similarity between the real-world object and the silhouette object, where one of the similarity measures indicates similarity between a shape of the real-world object and the shape of the silhouette object, and (d) causing the graphical display to display a match indication based on the one or more similarity measures.

20 Claims, 12 Drawing Sheets

(56) References Cited

U.S. PATENT DOCUMENTS

| | | | |
|---|---|---|---|
| 2012/0321199 A1* | 12/2012 | Lim | G06K 9/6201 |
| | | | 382/199 |
| 2013/0044129 A1 | 2/2013 | Latta et al. | |
| 2013/0147837 A1* | 6/2013 | Stroila | G06T 19/006 |
| | | | 345/633 |
| 2013/0162673 A1 | 6/2013 | Bohn | |
| 2014/0125574 A1* | 5/2014 | Scavezze | G06F 21/31 |
| | | | 345/156 |
| 2014/0240349 A1* | 8/2014 | Tuukkanen | G06F 3/0484 |
| | | | 345/633 |
| 2015/0206329 A1* | 7/2015 | Devries | G06T 11/00 |
| | | | 345/633 |
| 2015/0260474 A1* | 9/2015 | Rublowsky | F41A 33/00 |
| | | | 434/16 |

* cited by examiner

IMAGE-RECOGNITION BASED GAME

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

Example embodiments may provide for an image-recognition based game where a graphical display of a computing device, such as a head-mountable device (HMD), displays a silhouette of an object, and a user (e.g., a wearer of the HMD) attempts to use the computing device to capture an image of a real-world object that matches the silhouette. The silhouette may have one or more characteristics (e.g., a shape, size, color, pattern, etc.), and may be overlaid on a view of the real world, for example, by displaying a preview image in which the silhouette is overlaid on image data of the real world or by displaying the silhouette in a see-through display such that the silhouette is within the field of view of the user. The user may then move his or her head to attempt to align the silhouette with a real-world object that matches (e.g., has similar characteristics as) the silhouette. The user may then utilize the computing device's camera to capture an image in which the silhouette is aligned with the real-world object. Thereafter, the image may be analyzed to determine whether the real-world object matches the silhouette, for example, by evaluating whether the real-world object has characteristics similar to the characteristics of the silhouette. When such a determination is made, the computing device may prompt the user that a match has been made and/or indicate a degree to which the real-world object matches the silhouette.

In one aspect, a method may involve: (1) receiving by a computing device an input to initiate a game application, (2) causing the game application to initiate a game, and (3) during gameplay of the game: (a) causing a graphical display of a computing device to display a silhouette object, where the silhouette object comprises a shape of the silhouette object, (b) receiving by the computing device image data of an environment that includes a real-world object, (c) analyzing the image data to determine one or more similarity measures that indicate similarity between the real-world object and the silhouette object, where one of the similarity measures indicates similarity between a shape of the real-world object and the shape of the silhouette object, and (d) causing the graphical display to display a match indication based on the one or more similarity measures.

In another aspect, a computing device may include: (1) a graphical display, (2) a camera, (3) an input interface, (4) a non-transitory computer-readable medium, and (5) program instructions stored on the non-transitory computer-readable medium and executable by at least one processor to cause the computing device to: (a) receive by the input interface an input to initiate a game application, (b) causing the game application to initiate a game, and (c) during gameplay of the game: (i) cause the graphical display to display a silhouette object, where the silhouette object comprises a shape of the silhouette object, (ii) receive by the camera image data of an environment that includes a real-world object, (iii) analyze the image data to determine one or more similarity measures that indicate similarity between the real-world object and the silhouette object, where one of the similarity measures indicates similarity between a shape of the real-world object and the shape of the silhouette object, and (iv) cause the graphical display to display a match indication based on the one or more similarity measures.

In a further aspect, a computing device may include: (1) means for receiving an input to initiate a game application, (2) means for causing the game application to initiate a game, and (3) during gameplay of the game: (a) means for causing a graphical display of the computing device to display a silhouette object, where the silhouette object comprises a shape of the silhouette object, (b) means for receiving image data of an environment that includes a real-world object, (c) means for analyzing the image data to determine one or more similarity measures that indicate similarity between the real-world object and the silhouette object, where one of the similarity measures indicates similarity between a shape of the real-world object and the shape of the silhouette object, and (d) means for causing the graphical display to display a match indication based on the one or more similarity measures.

In an additional aspect, a method may involve: (1) transmitting by a computing system to a computing device silhouette data that indicates a silhouette object that comprises a shape of the silhouette object, (2) receiving by the computing system from the computing device image data of an environment that includes a real-world object, (3) analyzing the image data to determine one or more similarity measures that indicate similarity between the real-world object and the silhouette object, where one of the similarity measures indicates similarity between a shape of the real-world object and the shape of the silhouette object, and (4)

transmitting by the computing system to the computing device match data that is based on the one or more similarity measures.

In one other aspect, a computing system may include: (1) a network interface, where the network interface communicatively couples the computing system to a computing device, (2) a non-transitory computer-readable medium, and (3) program instructions stored on the non-transitory computer-readable medium and executable by at least one processor to cause the computing system to: (a) transmit to the computing device silhouette data that indicates a silhouette object that comprises a shape of the silhouette object, (b) receive from the computing device image data of an environment that includes a real-world object, (c) analyze the image data to determine one or more similarity measures that indicate similarity between the real-world object and the silhouette object, where one of the similarity measures indicates similarity between a shape of the real-world object and the shape of the silhouette object, and (d) transmit to the computing device match data that is based on the one or more similarity measures.

In yet another aspect, a computing system may include: (1) means for transmitting to a computing device silhouette data that indicates a silhouette object that comprises a shape of the silhouette object, (2) means for receiving from the computing device image data of an environment that includes a real-world object, (3) means for analyzing the image data to determine one or more similarity measures that indicate similarity between the real-world object and the silhouette object, where one of the similarity measures indicates similarity between a shape of the real-world object and the shape of the silhouette object, and (4) means for transmitting to the computing device match data that is based on the one or more similarity measures.

These as well as other aspects, advantages, and alternatives will become apparent to those of ordinary skill in the art by reading the following detailed description, with reference where appropriate to the accompanying drawings.

DETAILED DESCRIPTION

Figure 1A:
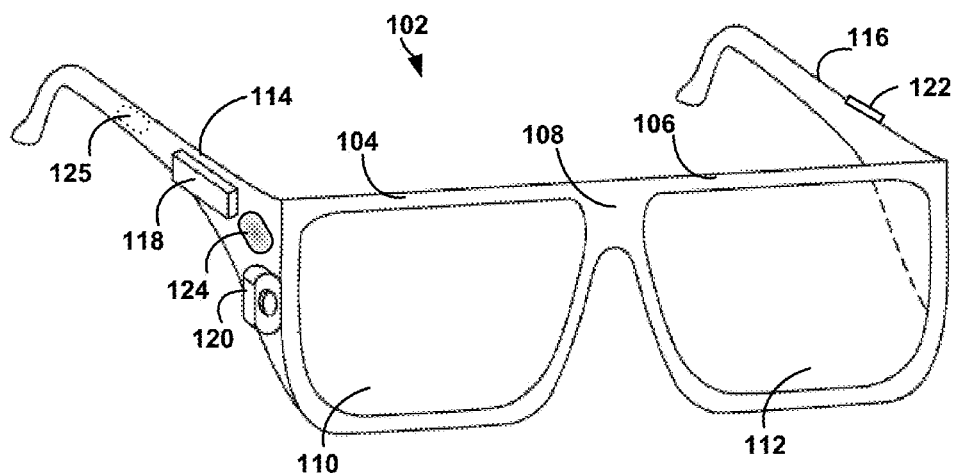
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Computing devices, such as HMDs, may be used for a variety of purposes and in a variety of contexts. For example, a user may use a computing device to play a game. Typically, gameplay on a computing device may involve a user navigating through or otherwise interacting with a virtual world. In some applications, it may be desirable to provide a computing-device game that involves a user interacting with the real world as well as a virtual world.

Example embodiments described herein may provide for an image-recognition based game that is played on an HMD. The game may involve an HMD providing an interface that allows a user (or sometimes referred herein as a "player") to capture an image of a real-world object that has characteristics similar to a computer-generated object and the HMD determining a game result based on how well the representation of the real-world object in the captured image matches the computer-generated object.

In particular, the game may begin with a user interacting with a game application stored on the user's HMD in such a way that causes the game application to start the image-recognition based game described herein. During gameplay of the game, the HMD may display to a user a silhouette of an object. The silhouette may have one or more characteristics, such as a shape, size, position, color, and/or pattern, among other characteristics. In one example, the HMD may be configured to output to the user a preview image that displays an environment presently within the field of view of a camera of the HMD. In such an example, the silhouette may be overlaid on the preview image. As such, the silhouette may be displayed in a partially transparent manner or the like so as to reduce any obstruction of the user's view of the environment shown in the preview image.

The game may progress with the HMD outputting the preview image to the user as the user attempts to locate a real-world object that has similar characteristics to those of the silhouette (e.g., a similar shape, size, position, color, pattern, etc.). In one implementation, when the user finds such a real-world object, the user may position the HMD and/or arrange the real-world object such that the real-world object is substantially aligned with the silhouette as shown on the preview image. For example, the user may move towards or away from the real-world object to align the real-world object with the silhouette as viewed on the preview image. In another implementation, the user may utilize a zoom function of the HMD camera to align the real-world object with the silhouette.

The game may then involve the HMD receiving image data corresponding to the image shown on the preview image. In one example, the HMD may receive the image data in response to an input from the user. For instance, the user may determine that the real-world object is satisfactorily aligned with the silhouette and may then cause the camera to receive the image data. In another example, the HMD may automatically receive the image data when the HMD determines that the real-world object is sufficiently aligned with the silhouette.

In any event, the image data may then be analyzed to determine one or more similarities between the real-world object and the silhouette. The HMD, a device linked with the HMD, or a cloud server in communication with the HMD may perform this analysis. In one implementation, this analysis may involve performing one or more image processing procedures on the image data to identify characteristics of the real-world object captured in the image data. For example, one or more object recognition techniques may be used to determine the shape of the real-world object and the determined shape may then be compared to the shape of the silhouette. Other example image processing procedures may also be performed.

If it is determined that the characteristics of the real-world object and those of the silhouette are substantially similar, the game may continue with the HMD displaying a match indication that indicates a successful match and possibly awarding a certain point value to the user based on the determined similarities. The HMD may thereafter display a new silhouette and thereby progress gameplay.

In an illustrative example, the silhouette may take the shape of a circle. In such an example, the user may see a preview image of the field of view of the HMD camera with a semi-transparent silhouette overlaid in the center. As the user moves his or her head, the preview image moves with the HMD camera to show different parts of the user's environment, but the silhouette remains centered in the preview image. In this way, the user may align the silhouette with a real-world object in the preview image.

For example, the user may locate a basketball. In such an example, the user may be able to see the basketball through the semi-transparent silhouette in the preview image and may also move the circle silhouette over the basketball. Further, the user may move further from or closer to the basketball in an effort to make the relative size of the basketball in the preview image the same size as the circle silhouette (or alternatively, the user may use a zoom function of the camera to accomplish the same).

When the user has centered the circle silhouette on the basketball and the user is positioned at a distance such that the circle silhouette and the basketball are approximately the same size in the preview image, the user may then use the HMD camera to take a picture. The HMD or a cloud server may then analyze the picture to determine how close, for example, the shape, size, and/or position of the basketball are to the shape, size, and/or position of the circle silhouette.

It should be understood that the above embodiments and others described herein are provided for purposes of illustration, and are not intended to be limiting. Variations on the above embodiments and other embodiments are possible, without departing from the scope of the invention as set forth by the claims.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer-readable medium, which has program instructions stored thereon that are executable by at a processor to provide the functionality described herein. An example system may also take the form of a device such as a wearable computer or mobile phone, or a subsystem of such a device, which includes such a non-transitory computer-readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is overlaid over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102

(e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
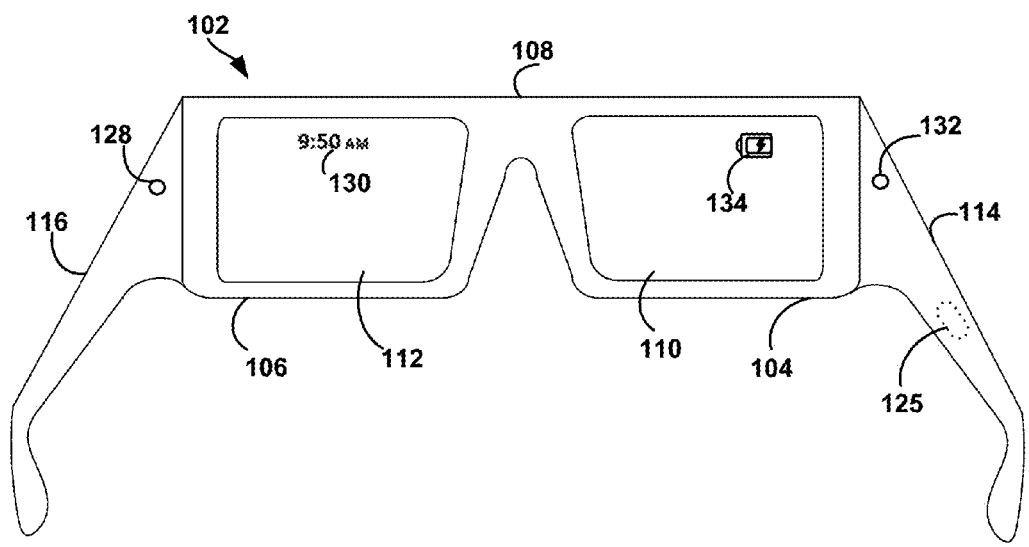
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
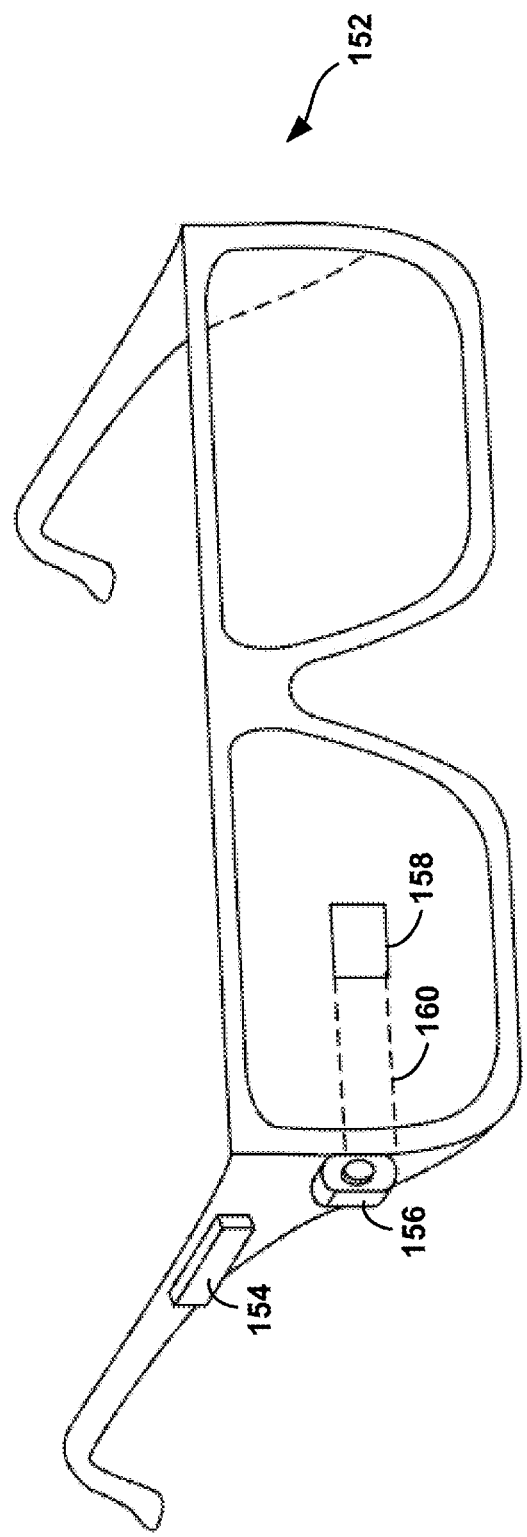
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
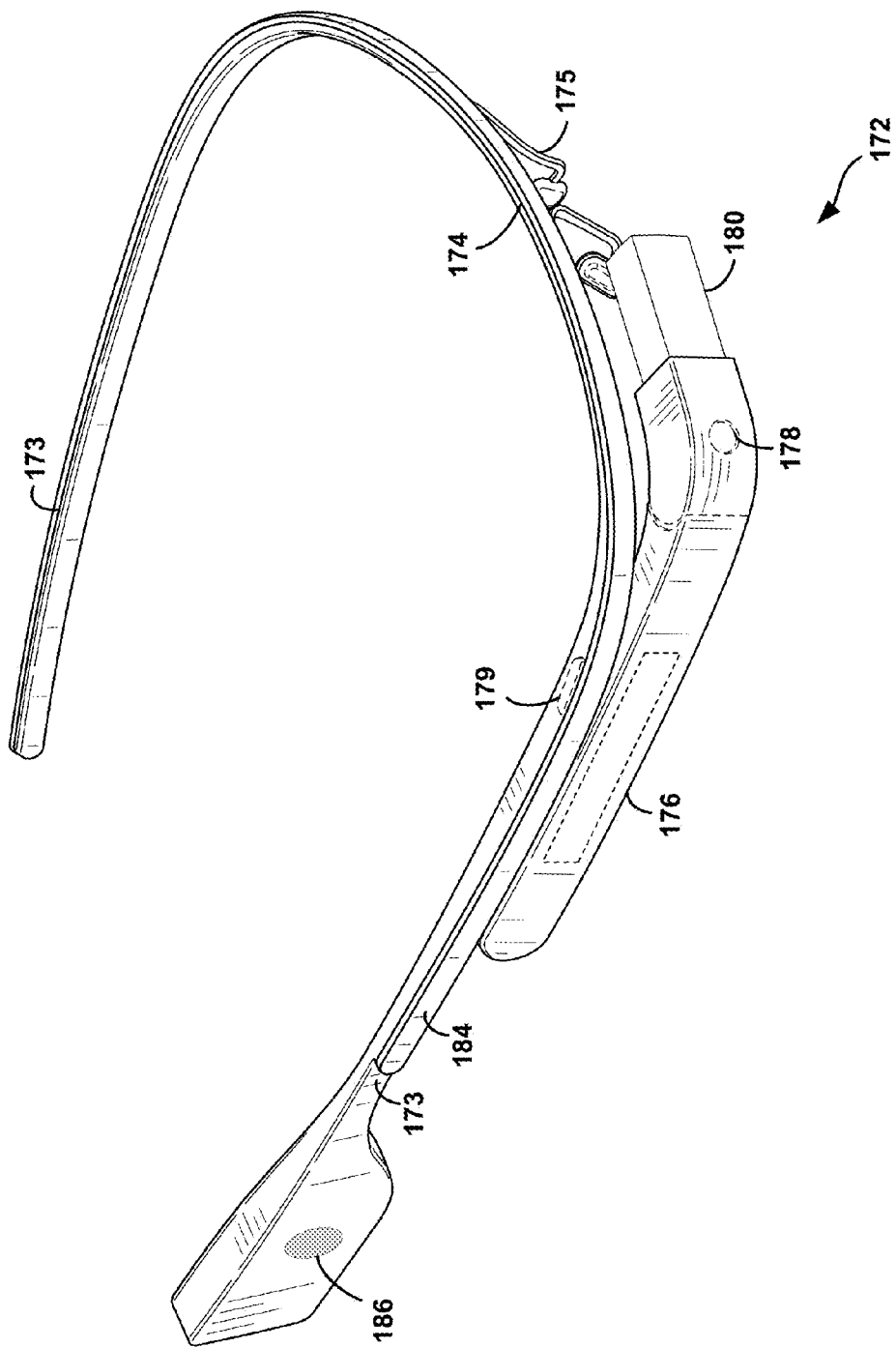
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
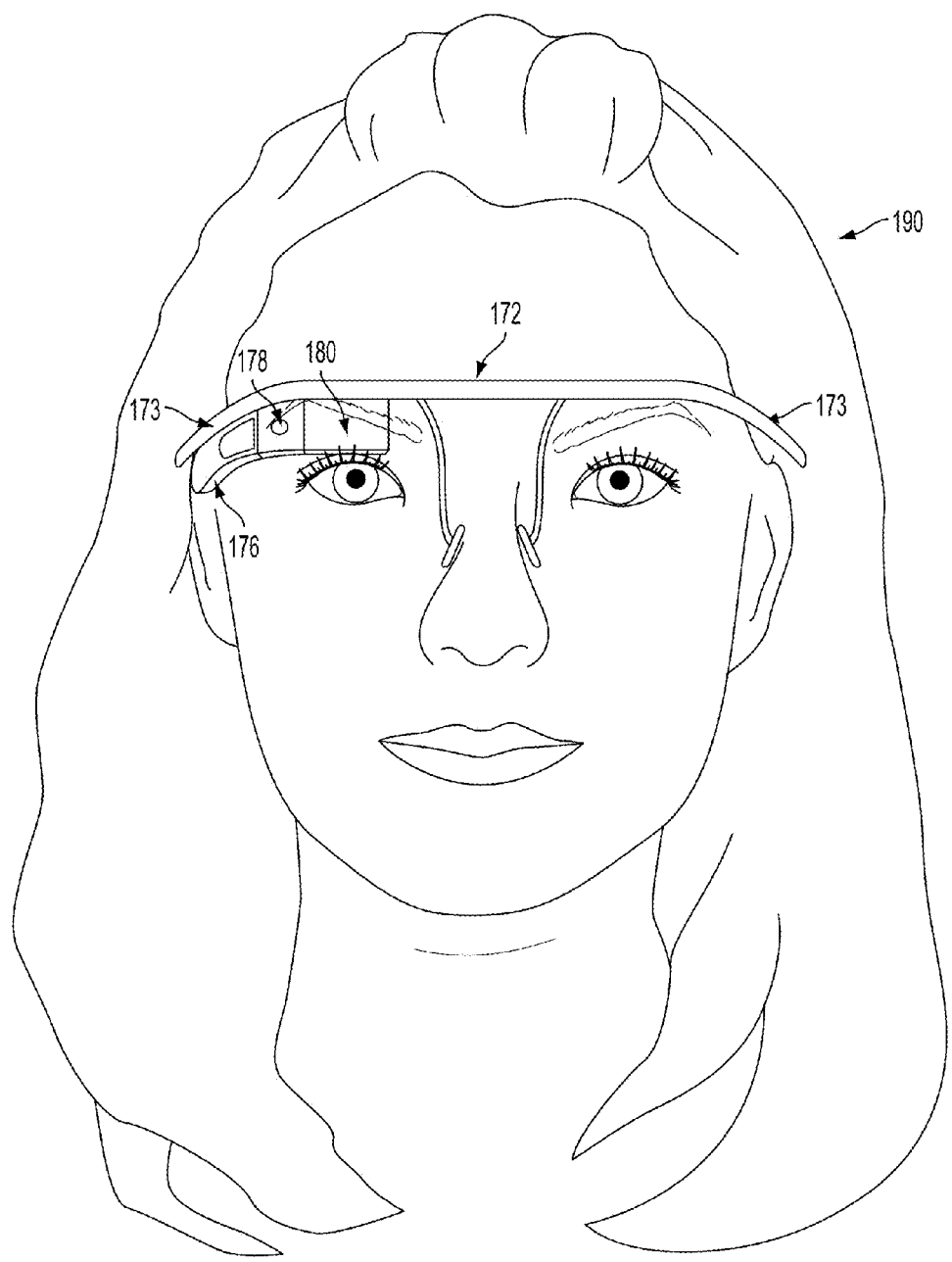
FIGS. 1E to 1G are simplified illustrations of the wearable computing system shown in FIG. 1D, being worn by a wearer.
Figure 1F:
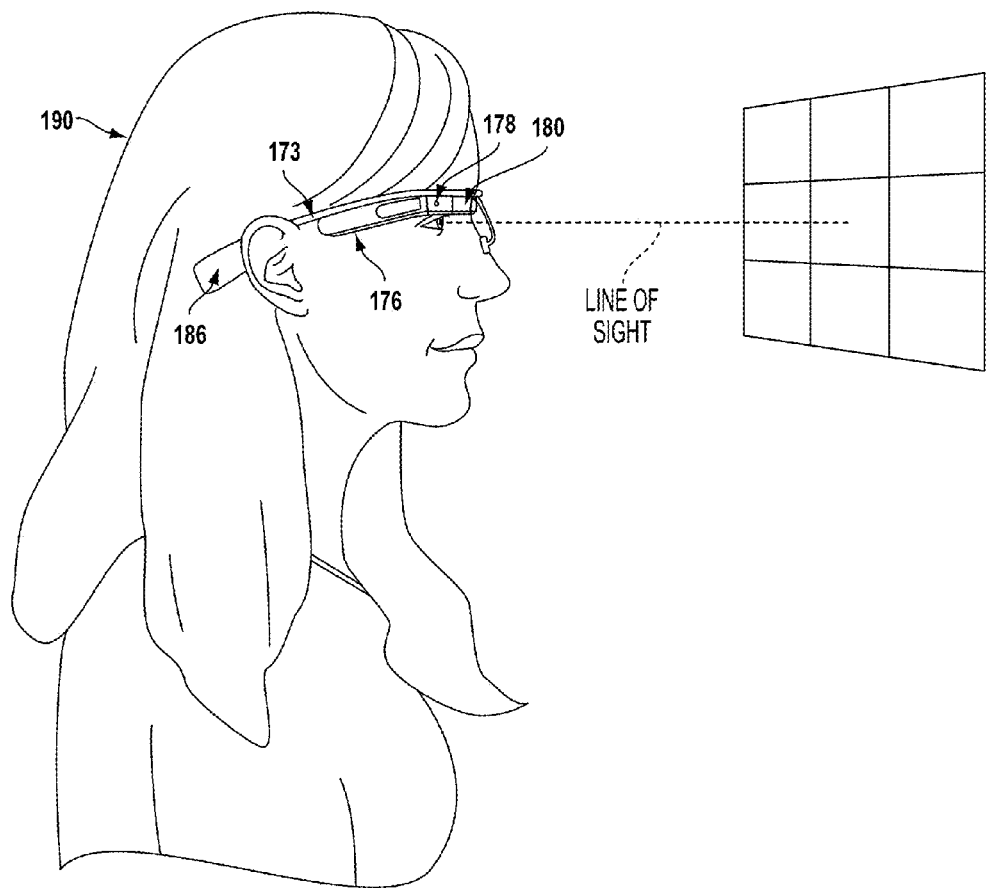
Figure 1G:
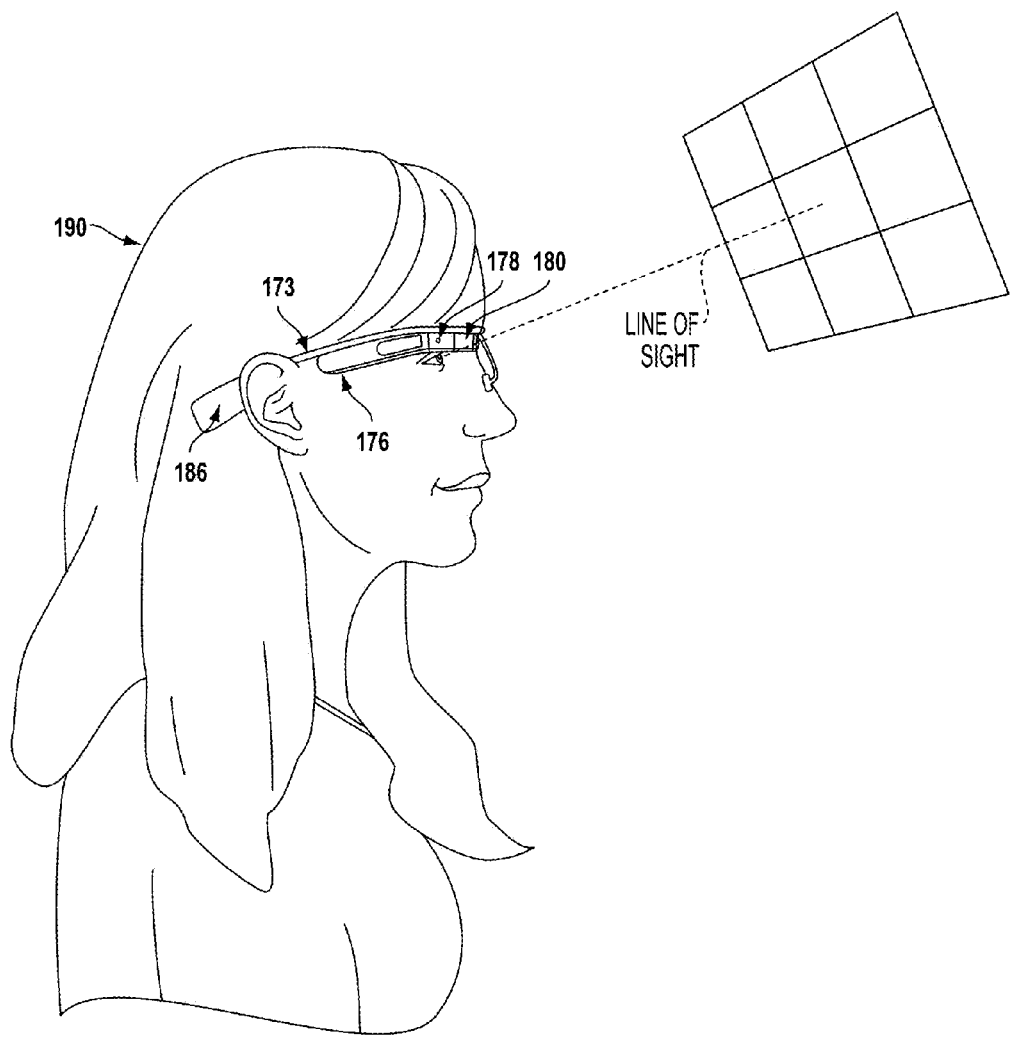

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer may also use the display by tilting their head down and aligning their eye with the display 180.

Figure 2A:
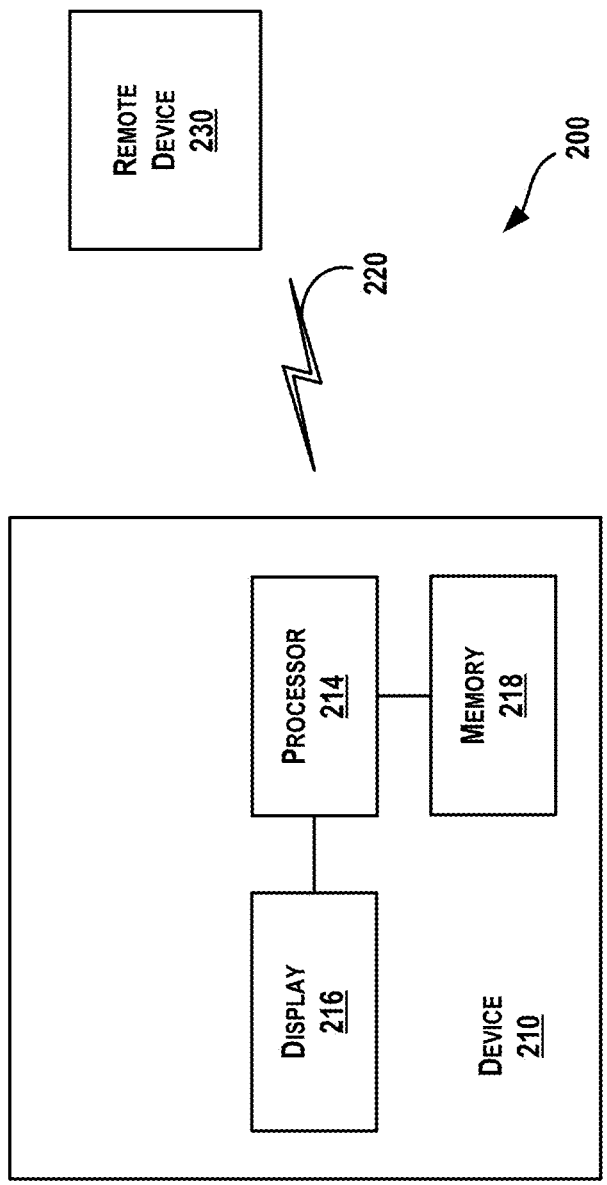
FIG. 2A is a simplified block diagram of a computing device according to an example embodiment.

FIG. 2A is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing. Additionally or alternatively, the remote device 230 may receive data from the computing device 210 and transmit that data to another processing device, such as a cloud server, that performs certain processing functions on behalf of the computing device 210 and/or the remote device 230. The remote device 230 may then receive the resulting data from the cloud server and then send such data back to device 210.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Example Methods

As discussed above, an HMD may be used to play a game, and in some situations, it may be desirable to play a game that involves interacting with the real world, such as the image-recognition based game described herein.

Figure 3A:
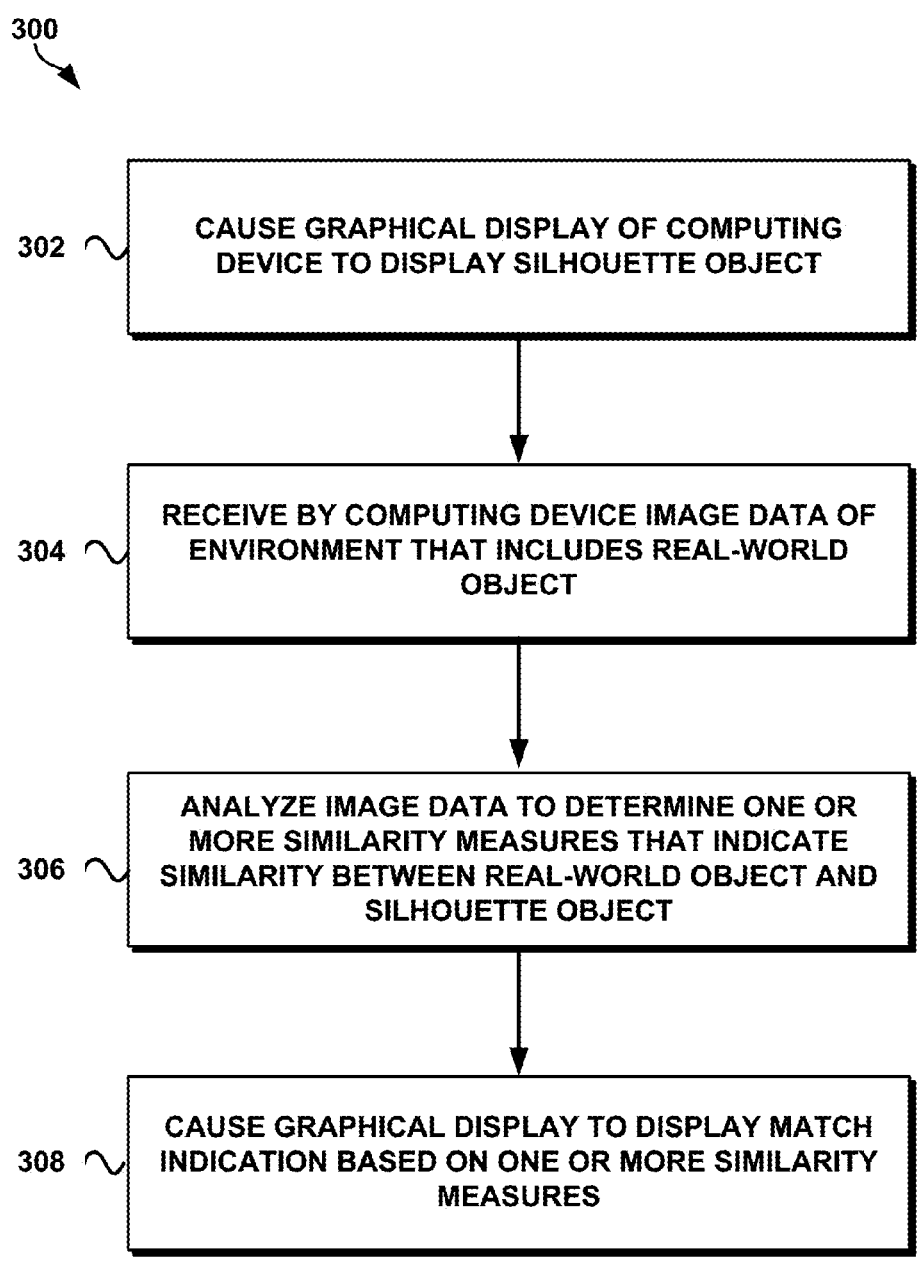
FIG. 3A is a flow chart illustrating a method according to an example embodiment.
Figure 3B:
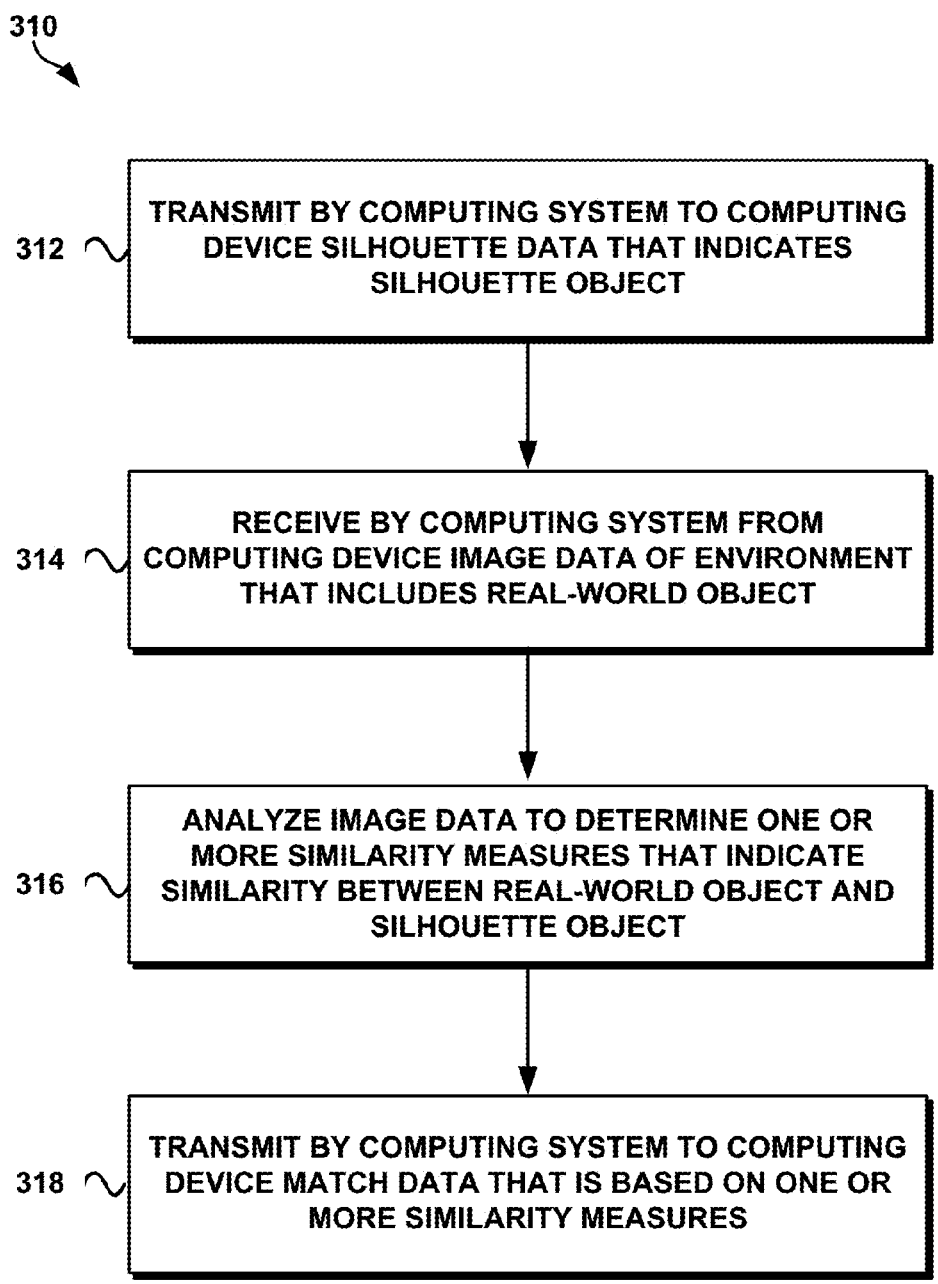
FIG. 3B is a flow chart illustrating another method according to an example embodiment.

FIGS. 3A and 3B are flowcharts that depict example methods for such a game. The example methods may be carried out on a network configuration where one or more computing devices (e.g., HMDs) are in communication with a computing system (e.g., a cloud server) via, for example, a data network. It should be understood that some or all of the blocks of the methods depicted in FIGS. 3A and 3B may be performed simultaneously and/or sequentially.

For clarity, the methods are described herein with reference to FIGS. 4A-4E, which depict example displays provided by a graphical display of a computing device, according to the example methods. It should be understood, however, that this is for purposes of example and explanation only and that various other example displays are certainly possible.

Furthermore, those skilled in the art will understand that the flowcharts described herein depict functionality and operation of certain implementations of example embodiments. In this regard, each block of each flowchart may represent a module, a segment, or a portion of program code, which includes one or more instructions executable by a processor for implementing specific logical functions or steps in the process. The program code may be stored on any type of computer-readable medium, e.g., such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those skilled in the art.

1. First Example Method

FIG. 3A illustrates a method 300 according to example embodiments. The method 300 may be carried out in whole or in part by an HMD, such as the head-mountable devices shown in FIGS. 1A to 1G. In particular, the method 300 may be carried out by components of an HMD, such as a control system. Such a control system may include, for example, a processor and program instructions stored on a non-transitory computer-readable medium, and/or additional or alternative components. Further, the method 300 or portions thereof may be carried out by components of an HMD other than a control system. Yet further, the method 300, or portions thereof, may be carried out by a computing device that is in communication with an HMD. The method 300 may also be carried out by other types of computing devices and/or combinations of computing devices, without departing from the scope of the invention. Other examples of such computing devices include, but are not limited to, other types of wearable computing devices, mobile phones, and tablet computers.

Before the method 300 begins, one or more game initiation processes may occur. In particular, such processes may involve a computing device receiving an input (e.g., a touch input or voice command) to initiate a game application (e.g., that is stored in memory of the computing device). The computing device may then cause the game application to initiate the game. The method 300 may then represent what occurs during gameplay of the game.

The method 300 may begin at block 302 with causing a graphical display of the computing device to display a silhouette object, where the silhouette object includes at least a shape of the silhouette object. At block 304, the method 300 may involve receiving by the computing device image data of an environment that includes a real-world object. At block 306, the method 300 may involve analyzing the image data to determine one or more similarity measures that indicate similarity between the real-world object and the silhouette object, where one of the similarity measures indicates similarity between a shape of the real-world object and the shape of the silhouette object. At block 308, the method may involve causing the graphical display to display a match indication based on the one or more similarity measures. The blocks shown with respect to FIG. 3A are discussed in further detail below.

a. Causing Graphical Display to Display Silhouette Object

As noted above, the method 300 may begin at block 302 with causing a graphical display of a computing device to display a silhouette object, where the silhouette object includes at least a shape of the silhouette object.

In practice, this function may involve, for example, the HMD 172 first receiving silhouette data from, for example, a cloud server, and then the HMD 172 receiving an input to start the image-recognition based game. For instance, the HMD 172 may receive a user input (e.g., a touch input or a voice command) that launches the game. Thereafter, the HMD 172 may then cause a graphical display to display the silhouette object. The HMD 172 may perform this function in a number of ways.

In one implementation, this function may involve the HMD 172 displaying the silhouette object in a see-through display (e.g., the display 180) such that the silhouette object is within the field of view of the user. Additionally or alternatively, this function may involve the HMD 172 causing the display 180 to display a preview image overlaid with the silhouette object on image data of the real world. As noted above, the preview image may include a representation of an environment presently within the field of view of the image capture device 178. That is, the preview image may provide a live view of aspects of the user's environment. In such an arrangement, the silhouette object may be displayed in a manner that, at most, partially obstructs the vision of the user (e.g., the wearer of the HMD). For example, the silhouette object may be displayed in a semi-transparent manner and/or may be displayed by non-solid lines. Other examples are possible as well.

Figure 4A:
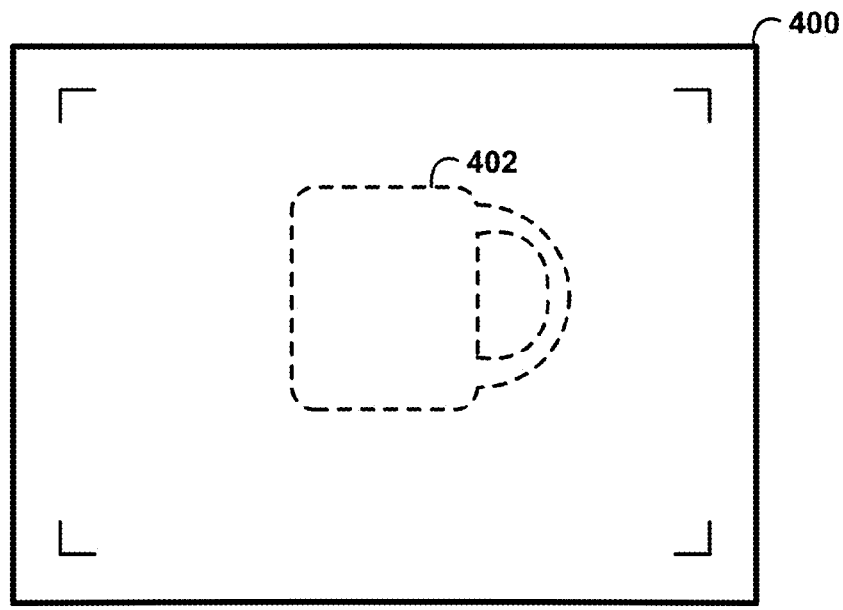
FIGS. 4A-4E are simplified illustrations of graphical displays according to example embodiments.

As noted above, the displayed silhouette object includes at least a shape of the silhouette object. This shape may take many forms. For example, the shape of the silhouette object may take the form of a geometric shape (e.g., a square, circle, triangle, etc.) or a more complex shape (e.g., a shape that resembles a shape of a real-world object, such as a water bottle). For purpose of illustration, FIG. 4A shows an example of such a shape as displayed on a graphical display. As shown, the graphical display includes a preview image 400 overlaid with a silhouette object 402 (for clarity, the environment that is within the field of view of the image capture device 178 is not shown). The silhouette object 402 includes a shape (e.g., a coffee mug) and is displayed by non-solid, dashed lines. Other examples are certainly possible.

Figure 4B:
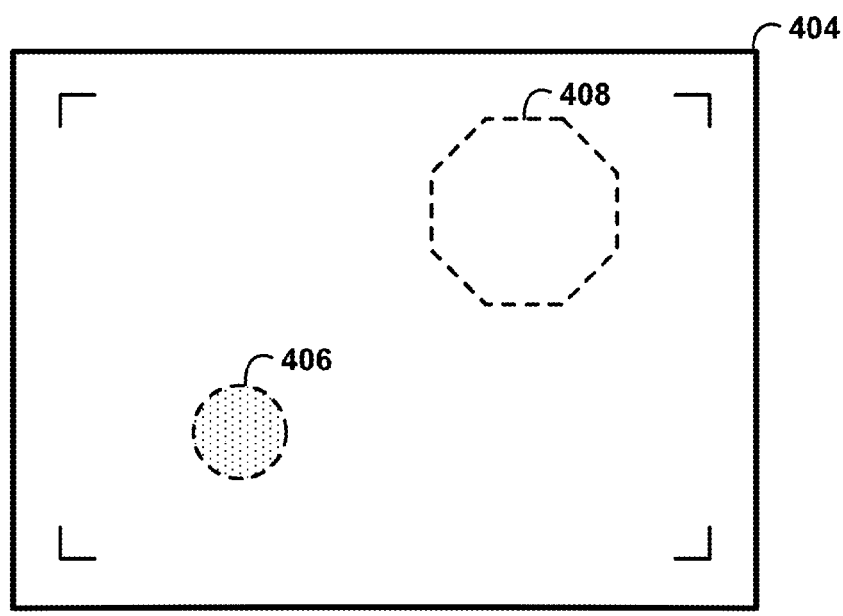

In addition to the shape of the silhouette object, in some implementations, the silhouette object may include other characteristics as well, such as a size, position, one or more colors, and/or one or more patterns. For example, the silhouette object 402 also includes a size (e.g., the coffee mug could be displayed smaller or larger) and a position within the preview image (e.g., a centered position). Further, the silhouette object may include multiple shapes (e.g., multiple circles, a circle and a square, etc.) and each of which may include additional characteristics as well. To illustrate, FIG. 4B shows an example of a silhouette object with multiple shapes as displayed on a graphical display. As shown, the graphical display includes a preview image 404 overlaid with a silhouette object (again, for clarity, the environment that is within the sights of the image capture device 178 is not shown). In this example, the silhouette object includes a first shape 406 (e.g., a circle) and a second shape 408 (e.g., an octagon), which may indicate that the user may have to locate two real-world objects.

In this way, the graphical display may display a silhouette object that serves as game instructions for the user of the HMD to find a real-world object with similar characteristics as those of the displayed silhouette object. For example, at a minimum, the shape of the silhouette object may serve as a game instruction for the user to find a real-world object with a shape similar to the shape of the silhouette object. In such an example, other characteristics of the real-world object, such as the size, position, color, and/or pattern, may not affect gameplay (e.g., how many points are eventually awarded to the wearer or how a player progresses to a next silhouette object).

On the other hand, in examples where the silhouette object includes a position as an additional characteristic, such characteristic may server as a game instruction for the user to position the real-world object and/or the HMD 172 such that the real-world object and the silhouette object are substantially aligned as shown on the preview image. In this way, a position characteristic may additionally involve a size characteristic, and accordingly, a game instruction for the user to arrange the real-world object so as to match the size of the silhouette object.

In other examples where the silhouette object includes additional characteristics, these characteristics may serve as additional game instructions for the wearer to find a real-world object with a size, color, and/or pattern similar to the size, color, and/or pattern of the silhouette object. In such examples, the silhouette object may be displayed in such a manner that notifies the wearer that these one or more characteristics in addition to the shape of the real-world object will affect gameplay. These other characteristics may be displayed in a number of manners.

In one example, where the silhouette object also includes a size of the silhouette object, the HMD 172 may indicate that the size of the real-world object affects gameplay by, for example, pulsating or otherwise emphasizing the outline of the displayed silhouette object. The HMD 172 may indicate that the position of the real-world object affects gameplay in a similar fashion. In other examples, the size and/or the position of the real-world object may affect gameplay by default and thus may not be displayed in an emphatic manner.

In another example, where the silhouette object also includes a color and/or a pattern of the silhouette object, the HMD 172 may indicate that the color and/or pattern of the real-world object affect gameplay by accenting the outline of the displayed silhouette object with the color and/or pattern that is to be matched. Additionally or alternatively, the HMD 172 may indicate that the color and/or pattern affect gameplay by displaying the silhouette object filled with the color and/or pattern that is to be matched, possibly in a semi-transparent manner. For example, the first shape 406 of FIG. 4B depicts one example of an indication that the pattern of the real-world object affects gameplay. Other examples are certainly possible.

Those of ordinary skill in the art will appreciate that these are but a few examples of possible ways to display additional characteristics that affect gameplay. Other examples are possible as well, and the specific details of how these additional characteristics are displayed are not critical to the embodiments described herein.

b. Receiving Image Data

Returning to FIG. 3A, at block 304, the method 300 may involve receiving by the computing device image data of an environment that includes a real-world object. For example, the HMD 172 may receive the image data by causing the image capture device 178 to capture an image of the environment that includes the real-world object. This function may be performed in a number of ways.

In one implementation, this function may involve the HMD 172 receiving image data in response to a user input, such as a touch input or a voice command. In other implementations, the HMD 172 may automatically receive image data when the HMD 172 makes a determination that a real-world object is within the field of view of the image capture device 178 and that the real-world object includes characteristics similar to those of the silhouette object.

In practice, the HMD may continue to display the preview image overlaid with the silhouette object to the user as the user attempts to locate a real-world object that has a shape similar to the shape of the silhouette object. As the user moves the HMD (e.g., by turning his or her head), the preview image may move as well and show different aspects of the user's environment. However, the silhouette object may remain fixed in the preview image, for example, in a centered position. This fixed position may allow the user to align the silhouette object with a real-world object in the preview image.

Figure 4C:
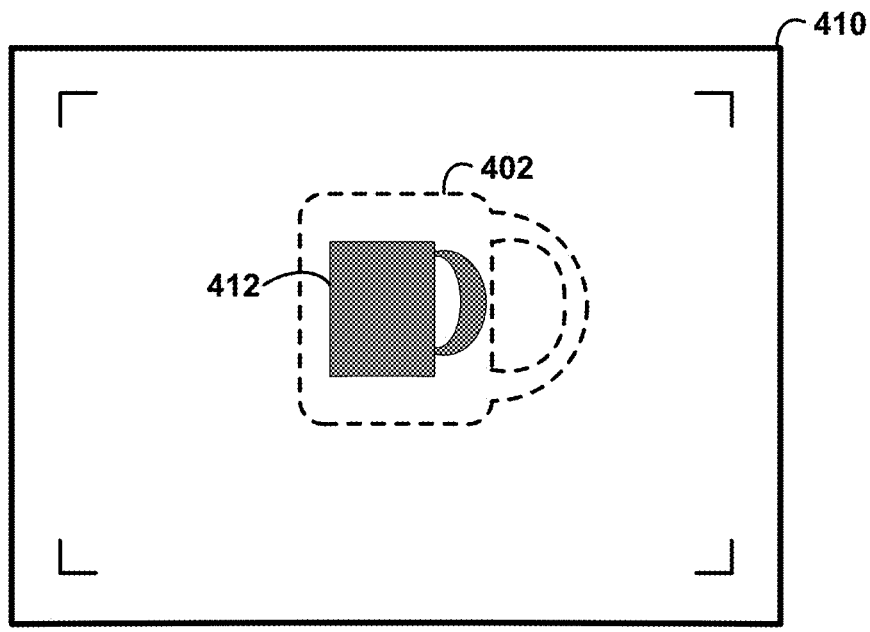

At some point, the user may locate a real-world object with characteristics similar to those of the silhouette object and may position the HMD 172 such that the real-world object is displayed within the preview image of the HMD 172. The HMD 172 may then receive image data based on a user input or based on the HMD 172 determining that a real-world object is within the field of view of the image capture device 178 and that the real-world object has a similar shape as the silhouette object. For purpose of illustration, FIG. 4C shows an example graphical display at a point in time when the HMD 172 may receive image data. As shown, the graphical display includes a preview image 410, which includes a real-world object 412 and the silhouette object 402 from FIG. 4A. The user or the HMD 172 itself may cause the HMD 172 to receive image data of the environment that includes the real-world object 412 as shown by the preview image 410.

In an implementation where the position of the real-world object affects gameplay, the user may position the real-world object and/or the HMD such that the real-world object is substantially aligned with the silhouette object as shown in the preview image. For example, the user may physically move himself or herself (and thus the HMD) and/or move the real-world object. In other examples, the image capture device 178 may be configured with zoom functionality, and the user may align the real-world object using such functionality. In particular, the HMD 172 may receive a zoom input from the user and may responsively zoom the image capture device 178 to change the preview image, while at the same time keeping the silhouette object (e.g., the size, shape, and position of the silhouette object) fixed in the preview image. Other examples are also possible.

Figure 4D:
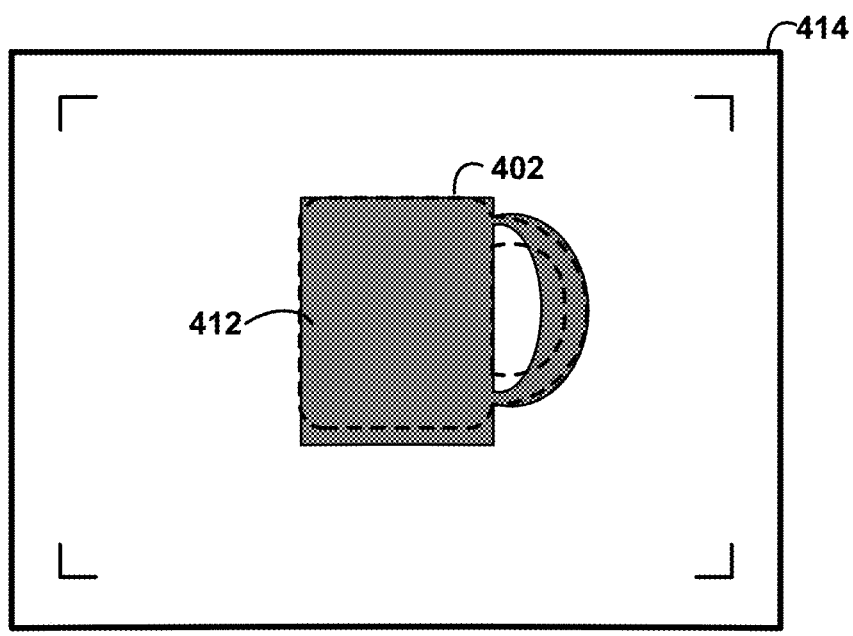

To illustrate such an implementation, turning now to FIG. 4D, an example graphical display is shown that includes a preview image 414, which includes the real-world object 412 and the silhouette object 402. Notably, as shown, the preview image 414 depicts the real-world object 412 in a position that is substantially aligned with the silhouette object 402. By contrast, the preview image 410 of FIG. 4C depicts the real-world object 412 in a position that is not substantially aligned with the silhouette object 402. The preview image 414 of FIG. 4D may have been a result of the user moving the HMD 172 towards the real-world object 412, the user moving the real-world object 412 toward the HMD 172, and/or the HMD 172 zooming in the image capture device 178.

In any event, in one example of this implementation, the user may determine that the real-world object is positioned satisfactorily within the silhouette and cause the HMD 172 to receive image data. In another example, where the HMD 172 automatically receives image data, the HMD 172 may determine that the real-world object 414 includes a shape substantially similar to the shape of the silhouette object 402 and that the real-world object 414 is substantially aligned with the silhouette object 402. In turn, the HMD 172 may then receive image data corresponding to the image shown on the preview image. By contrast, the HMD 172 may not automatically receive the image data corresponding to the image shown on the preview image 410 of FIG. 4C because the real-world object 412 is not substantially aligned with the silhouette object 402.

Similarly, in implementations where additional characteristics affect gameplay, such as size, color, and/or pattern, the user may locate a real-world object with such characteristics. The user may then position the HMD 172 and/or the real-world object such that the real-world object is displayed within the preview image of the HMD 172. Thereafter, the user may cause the HMD 172 to receive image data of an environment that includes the real-world object, or the HMD 172 may automatically receive such image data upon determining that the real-world object includes a shape and additional characteristics (e.g., size, color, and/or pattern) substantially similar to the shape and additional characteristics of the silhouette object.

c. Analyzing Image Date to Determine Similarity Measures

Returning back to FIG. 3A, at block 306, the method 300 may involve analyzing the image data to determine one or more similarity measures that indicate similarity between the real-world object and the silhouette object, where one of the similarity measures indicates similarity between a shape of the real-world object and the shape of the silhouette object. For example, the HMD 172 may analyze the image data to determine the one or more similarity measures.

As noted above, the one or more similarity measures indicate similarity between the real-world object and the silhouette object. That is, a similarity measure indicates a degree of accuracy with respect to the user identifying a real-world object with characteristics similar to those of the silhouette object. Accordingly, the HMD 172 may analyze the image data to determine a similarity measure for each characteristic that was included as a game instruction to the user by way of the displayed silhouette object. The HMD 172 may therefore perform this function in a number of ways.

In one implementation, the HMD 172 may analyze the image data for a particular characteristic, which may involve utilizing one or more image processing procedures, and may then compare the analyzed characteristic with the corresponding characteristic of the silhouette object. From the comparison, the HMD 172 may determine whether the characteristic of the real-world object is substantially similar to the characteristic of the silhouette object. In particular, the HMD 172 may quantify how closely the characteristic of the real-world object matches that of the silhouette object (e.g., by calculating a match percentage that indicates a degree of accuracy). In some implementations, the HMD 172 may also award the user a certain number of points or the like based on the similarity measure, which may affect how gameplay progresses.

As discussed above, one of the similarity measures indicates similarity between the shape of the real-world object and the shape of the silhouette object. In practice, the HMD 172 may determine this similarity measure by applying one or more object recognition processes to the image data to determine the shape of the real-world object. In example implementations, the object recognition process may include edge matching, greyscale matching, or gradient matching, among other object recognition processes now known or later developed.

Once the HMD 172 determines the shape of the real-world object, the HMD 172 may then compare the determined shape and the shape of the silhouette object, for example, in accordance with the object recognition process utilized. For instance, when the HMD 172 uses edge matching, the HMD 172 may compare the determined shape and the shape of the silhouette object by evaluating, for example, the number of overlapping edges. Based on the comparison, the HMD 172 may determine the similarity between the shape of the real-world object and the shape of the silhouette object and possibly award the user points when the HMD 172 determines that the shapes are substantially similar. To illustrate, when the HMD 172 analyzes the image data corresponding to the preview images 410 and 414 of FIGS. 4C and 4D, the resulting shape similarity measures for both may indicate a very close match with respect to shape. Accordingly, the HMD 172 may award a relatively high point total to the user.

In another example, one of the similarity measures may indicate similarity between the shape of the real-world object and the shape of the silhouette object as well as between the size of the real-world object and the size of the silhouette object. The HMD 172 may determine this similarity measure in a similar manner as the HMD 172 determines the shape similarity measure as discussed above. In one implementation, the HMD 172 may use the analysis from the shape similarity measure to compare the relative sizes of the determined shape and the shape of the silhouette object. The HMD 172 may then determine the similarity between the shape and size of the real-world object and silhouette object. To illustrate, turning again to FIGS. 4C and 4D, when the HMD 172 analyzes the image data corresponding to the preview images 410 and 414, the resulting shape-size similarity measure may indicate a very close match for the preview image 414 and a moderate match for the preview image 410. That is because, although both preview images have the same shape, the preview image 414 includes the real-world object 412 with a size that more closely resembles the size of the silhouette object 402 compared to the real-world object 412 as shown in the preview image 410. While this example involves a similarity measure associated with both shape and size, one indicating similarity in size alone is also possible.

In another example, one of the similarity measures may indicate similarity between the position of the real-world object and the position of the silhouette object. That is, this similarity measure may indicate how closely the real-world object was aligned with the silhouette object as displayed on the preview image at the time the HMD 172 received the image data. Again, the HMD 172 may use the analysis from the shape similarity measure to compare the position of the real-world object with that of the silhouette object. For example, once the shape of the real-world object is determined, the determined shape and the shape of the silhouette object may be overlaid in such a manner as to replicate the real-world object's and the silhouette object's relative positions as depicted on the preview image at the time the HMD 172 received the image data. The HMD 172 may then determine a position similarity measure and possibly award the user points. To illustrate, when the HMD 172 analyzes the image data of the preview image 414 of FIG. 4C, the resulting position similarity measure may indicate a very close match with respect to position, while the resulting position similarity measure for the image data of the preview image 410 of FIG. 4D may indicate a comparatively weaker match with respect to position.

In other examples, one of the similarity measures may indicate similarity between a color of the real-world object and a color of the silhouette object. In such an example, the HMD 172 may determine a color or colors of the real-world object by using a color detection procedure, and then the HMD 172 may compare the detected color to the color of the silhouette object. In some implementations, the HMD 172 may determine the color similarity measure in a manner where any shade of the silhouette color is considered a match. For example, if the silhouette color is blue, then a "baby blue" real-world object and a "navy blue" real-world object may be scored the same. On the other hand, in other implementations, the HMD 172 may determine the color similarity measure by evaluating the shade of the detected color and the shade of the color of the silhouette object. In such an implementation, for example, a "baby blue" real-world object and a "navy blue" real-world object may be scored differently. Other examples are certainly possible.

In yet other examples, one of the similarity measures may indicate similarity between a pattern of the real-world object and a pattern of the silhouette object. In such an example, the HMD 172 may determine a pattern of the real-world object by using a pattern recognition process, and then the HMD 172 may compare the determined pattern with the pattern of the silhouette object. The HMD 172 may then determine a pattern similarity measure and possibly award the user points when the patterns are substantially similar. For example, a silhouette object may include a pattern similar to the pattern of a basketball. In such an example, image data that includes a real-world basketball may score higher than image data that includes a real-world bowling ball. Other examples are possible as well.

Those of ordinary skill in the art will appreciate that the above examples are but a few examples of similarity measures. Other example similarity measures are possible as well, and the complexity of the gameplay may dictate the number of similarity measures the HMD 172 analyzes and/or how the HMD 172 performs such analysis.

d. Causing Graphical Display to Display Match Indication

Returning again to FIG. 3A, at block 308, the method 300 may involve causing the graphical display to display a match indication based on the one or more similarity measures. The match indication may be any feedback to the user regarding the image data that the HMD 172 received.

For example, after the HMD 172 finishes analyzing the image data, the HMD 172 may cause the display 180 (and/or BCT 186) to display a textual, audio, or audio-visual indication, or any combination thereof, that notifies the user that the user has identified a real-world object similar to the silhouette object. That is, the HMD 172 may programmatically conclude from the one or more similarity measures that the real-world object satisfies the game instructions related to the silhouette object and may output such conclusion via the match indication. In practice, this function may be performed in a number of ways.

In one implementation, the HMD 172 may cause the display 180 to display a match indication once the HMD 172 determines that the image data includes a real-world object with one or more of the characteristics of the silhouette object regardless of how closely the characteristics match. In other implementations, the HMD 172 may cause the display 180 to display the match indication once the HMD 172 awards the user a threshold amount of points based on the similarity measures. In another implementation, the HMD 172 may cause the display 180 to display a match indication for individual characteristics of the silhouette object as the user causes the HMD 172 to receive image data of a real-world object that includes such characteristics. Other examples are possible as well.

In some implementations, the match indication may additionally include an indication of a degree to which the real-world object matches the silhouette object. For example, the HMD 172 may output to the user a score that is based on the similarity measures. The match indication may include additional information as well.

Figure 4E:
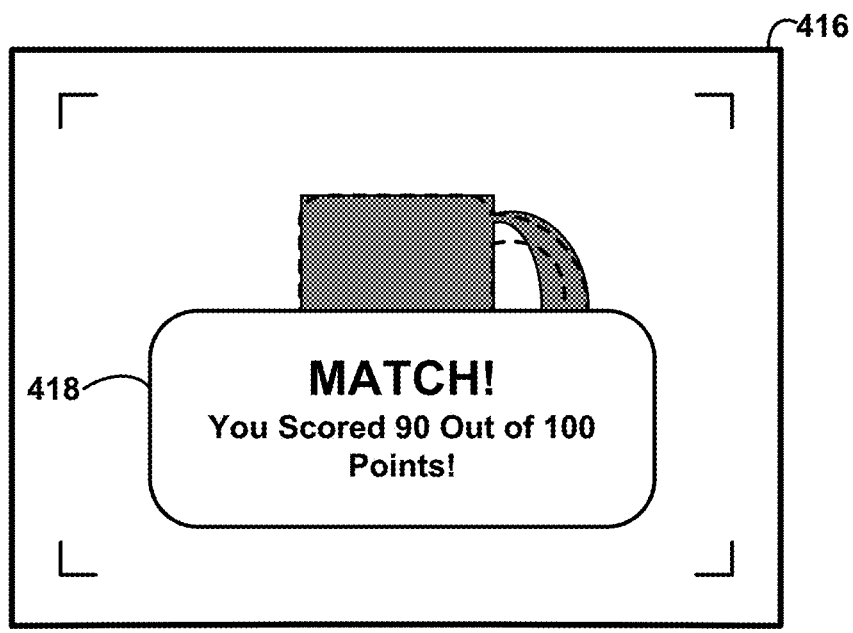

To illustrate, turning now to FIG. 4E, an example graphical display is shown that includes a match indication 418. As depicted, the match indication 418 includes a textual indication that the user has identified a real-world object similar to the silhouette object and a score that was awarded to the user based on the similarity measures. It should be understood that the match indication 418 is but one example of a possible match indication and other examples are certainly possible.

Depending on the particular gameplay, after the HMD 172 displays the match indication, the HMD 172 may subsequently perform a variety of functions. In some implementations, the game may be a multi-round game, and accordingly, gameplay may then involve repeating the method 300 for multiple silhouette objects. In one example of such an implementation, after the HMD 172 displays the match indication, the HMD 172 may cause the display 180 to display a new silhouette object and may continue to do so for a predetermined, or perhaps random, number of silhouette objects. Additionally or alternatively, the HMD 172 may display a new silhouette only when the user accumulates a certain amount of points. For example, if after a first iteration of blocks 302 through 306 the user does not have a threshold amount of points (e.g., the real-world object's characteristics were not sufficiently similar to those of the silhouette object), the HMD 172 may prompt the user to attempt to identify a new real-world object that matches the original silhouette object.

Additionally or alternatively, gameplay may progress by a user matching a first characteristic (e.g., shape) and then receiving a prompt to match a second characteristic (e.g., color). For instance, the user may first capture image data of a real-world object that has a shape similar to that of the silhouette object. After the HMD 172 analyzes the image data and confirms that the user has found a similarly shaped real-world object, the HMD 172 may then display the silhouette object with a new characteristic emphasized, such as a color, which instructs the user to now find a real-world object with a similar shape and color as the silhouette object. These examples are just a few possible functions that the HMD 172 may perform after causing the graphical display to display the match indication and should not be construed as limiting. Other examples are certainly possible.

2. Second Example Method

FIG. 3B illustrates a method 310 according to example embodiments. The method 310 may be carried out by a computing system, such as a cloud server in communication with an HMD. Such a cloud server may include, for example, a network interface that communicatively couples the cloud server to one or more computing devices, a processor, and program instructions stored on a non-transitory computer-readable medium. However, the cloud server may additionally or alternatively include other components. The example method may also be carried out by other types of computing systems and/or combinations of computing systems, without departing from the scope of the invention.

Before the method 310 begins, one or more game initiation processes may occur. In particular, such processes may involve a computing system receiving initiation data from a computing device that indicates a request for the computing system to initiate a game. The method 310 may then represent what occurs after the computing system receives such a request.

The method 310 may begin at block 312 with transmitting by a computing system to a computing device silhouette data that indicates a silhouette object, where the silhouette object includes at least a shape of the silhouette object. At block 314, the method may involve receiving by the computing system from the computing device image data of an environment that includes a real-world object. At block 316, the method may involve analyzing the image data to determine one or more similarity measures that indicate similarity between the real-world object and the silhouette object, where one of the similarity measures indicates similarity between a shape of the real-world object and the shape of the silhouette object. At block 318, the method may involve transmitting by the computing system to the computing device match data that is based on the one or more similarity measures. The blocks shown with respect to FIG. 3B are discussed in further detail below.

a. Transmitting Silhouette Data

The method 310 may begin at block 312 with transmitting by a computing system to a computing device silhouette data that indicates a silhouette object, where the silhouette object includes at least a shape of the silhouette object. For example, a cloud server may have access to a database that contains multiple silhouette data and may transmit silhouette data to an HMD (e.g., HMD 172) using a wide-area network, such as the Internet and/or a cellular network.

The silhouette data may include data that, when processed by the HMD 172, may cause the display 180 to display a silhouette object in line with the silhouette object discussed above. In particular, the silhouette data may indicate a shape and possibly other characteristics of a silhouette object that, when displayed, server as instructions to a user to play the image-recognition based game described herein.

b. Receiving Image Data

At block 314, the method 310 may involve receiving by the computing system from the computing device image data of an environment that includes a real-world object. For example, the cloud server may receive the image data from the HMD 172. The HMD 172 may have received the image data in line with the above discussion.

c. Analyzing Image Date to Determine Similarity Measures

At block 316, the method 310 may involve analyzing the image data to determine one or more similarity measures that indicate similarity between the real-world object and the silhouette object, where one of the similarity measures indicates similarity between a shape of the real-world object and the shape of the silhouette object. For example, the cloud server may analyze the image data in a similar manner as described above with respect to the HMD 172 analyzing image data.

In some implementations, after the cloud server analyzes the image data, the cloud server may store the image data, data from gameplay, and/or data from the analysis in a database. In such implementations, the cloud server may access the database at a future time and utilize such collected data for a variety of functions. In one example, the cloud server may use the collected data to create silhouette data for future gameplay. In other examples, the cloud server may use the collected data in other contexts that involve object recognition. Other examples are possible as well.

d. Transmitting Match Data

At block 318, the method 310 may involve transmitting by the computing system to the computing device match data that is based on the one or more similarity measures. For example, the cloud server may transmit the match data to the HMD 172. When the match data is processed by the HMD 172, the HMD 172 may cause the display 180 to display a match indication in line with the match indication discussed above.

In practice, after the cloud server transmits the match data, the cloud server may perform additional functions, depending on the gameplay. In one example, the cloud server may transmit new silhouette data to the HMD 172. In other examples, the cloud server may transmit silhouette data that indicates the original silhouette object but with an additional or updated characteristic. Other examples are certainly possible.

IV. Additional or Alternative Implementations

The image-recognition based game has been described as involving a single HMD. In some implementations, the game may be a multi-player game that involves multiple users each using respective HMDs. In such implementations, gameplay may be synced between the multiple HMDs such that the multiple users are competing against one another. Such gameplay may be carried out on a network configuration where multiple HMDs are communicatively coupled with one another and a computing system, such as a cloud server. For clarity, multi-player gameplay will be discussed with respect to two HMDs, but it should be understood that more than two HMDs may be used in such gameplay.

In practice, the cloud server may transmit to a first HMD and a second HMD one or more of the same silhouette data. This may be in response to, for example, a first user and/or a second user using their respective HMDs to send a game initiation request to the cloud server. Upon receiving the silhouette data, the first HMD and the second HMD may each display a first silhouette object that includes at least a shape of the first silhouette object. Each respective user may then attempt to locate a matching real-world object, and the game may progress as discussed above.

In one implementation, to "win" the game, the users may race to match a certain number of silhouette objects. That is, gameplay may involve a user matching the first silhouette object, and then receiving a second silhouette object that then must be matched. This may repeat for a specified number of silhouette objects. In other implementations, the user with the highest degree of accuracy with respect to similarity measures may win, with or without regard to time. Other examples are possible as well.

In some implementations, during gameplay, the cloud server may send game data to the first and second HMDs that may indicate information related to the progress of the game. For example, the game data may indicate each user's score, an image or other description of the silhouette object that a user's opponent is currently attempting to find, and/or a message from one user to the other, among other examples.

Those of ordinary skill in the art will appreciate that these are but a few examples of possible implementations of a multi-player game. Other examples are possible as well, and the specific details of how the multi-player game progresses are not critical to the embodiments described herein.

V. CONCLUSION

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

We claim:

1. A method comprising:
receiving by a computing device an input to initiate a game application, wherein the computing device comprises a camera and a graphic display;
causing the game application to initiate a game; and
during gameplay of the game:
operating the camera to capture image data of an environment;
operating the graphical display of the computing device to display a graphical silhouette object having a shape, wherein the graphical display provides a field of view of the environment and displays the silhouette object such that it is overlaid on the field of view of the real-world environment;
receiving input data indicating a desired alignment, in the field of view provided by the graphical display, of the silhouette object and a real-world object in the environment;
responsive to the input data indicating the desired alignment: (a) analyzing the image data of the environment to detect the real-world object in a portion of image data corresponding to the input data, and (b) determining one or more similarity measures that indicate similarity between the real-world object and the graphical silhouette object, wherein at least one of the similarity measures indicates similarity between a shape of the real-world object and the shape of the silhouette object; and
causing the graphical display to display a match indication based on the one or more similarity measures.

2. The method of claim 1, wherein operating the graphical display to display the graphical silhouette object comprises causing the graphical display to display preview image data overlaid with the silhouette object, wherein the preview image data comprises a representation of the environment that is within a field of view of a camera of the computing device.

3. The method of claim 2, further comprising:
while causing the graphical display to display the preview image data overlaid with the silhouette object and before receiving the image data, receiving by the computing device a zoom input; and
responsive to the zoom input, zooming the camera to change the representation of the environment, while at the same time keeping the graphical silhouette object fixed in the preview image data.

4. The method of claim 1, wherein the graphical silhouette object further comprises a size, and wherein one of the similarity measures indicates similarity between a size of the real-world object and the size of the graphical silhouette object and between the shape of the real-world object and the shape of the graphical silhouette object.

5. The method of claim 1, wherein determining the one or more similarity measures that indicate similarity between the real-world object and the graphical silhouette object comprises determining the shape of the real-world object.

6. The method of claim 5, wherein determining the one or more similarity measures that indicate similarity between the real-world object and the graphical silhouette object further comprises determining that the determined shape of the real-world object is substantially similar to the shape of the graphical silhouette object.

7. The method of claim 1, wherein the game is a multi-round game, and wherein the multi-round game comprises repeating the method of claim 1 for multiple graphical silhouette objects.

8. The method of claim 1, wherein the game is a multi-player game, and wherein the multi-player game comprises repeating the method of claim 1 for each respective player.

9. A computing device comprising:
a graphical display;
a camera;
an input interface;
a non-transitory computer-readable medium; and
program instructions stored on the non-transitory computer-readable medium and executable by at least one processor to cause the computing device to:
receive by the input interface an input to initiate a game application;
cause the game application to initiate a game; and
during gameplay of the game:
operate the camera to capture image data of an environment;
operate the graphical display to display a graphical silhouette object having a shape, wherein the graphical display provides a field of view of the environment and displays the silhouette object such that it is overlaid on the field of view of the real-world environment;
receive input data indicating a desired alignment, in the field of view provided by the graphical display, of the silhouette object and a real-world object in the environment;
responsive to the input data indicating the desired alignment: (a) analyze the image data of the environment to detect the real-world object in a portion of image data corresponding to the input data, and (b) determine one or more similarity measures that indicate similarity between the real-world object and the graphical silhouette object, wherein at least one of the similarity measures indicates similarity between a shape of the real-world object and the shape of the graphical silhouette object; and
cause the graphical display to display a match indication based on the one or more similarity measures.

10. The computing device of claim 9, wherein operating the graphical display to display the silhouette object comprises causing the graphical display to display preview image data overlaid with the graphical silhouette object, wherein the preview image data comprises a representation of the environment that is within a field of view of the camera.

11. A method comprising:
receiving, by a computer system, an input to initiate a game application; and
during gameplay of the game application;
transmitting by a computing system, to a computing device having a camera and a graphical display, silhouette data that indicates a graphical silhouette object, wherein the graphical silhouette object comprises a shape of the silhouette object, and wherein the graphical display of the computing device provides a field of view of an environment;
receiving by the computing system image data of the environment captured by the camera of the computing device, receiving, by the computing system, input data generated at the computing device that indicates a desired alignment, in the field of view provided by the graphical display, of the graphical silhouette object and a real-world object in the environment;

responsive to the input data indicating the desired alignment: (a) analyzing the image data of the environment to detect the real-world object in a portion of image data corresponding to the input data, and (b) determine one or more similarity measures that indicate similarity between the real-world object and the graphical silhouette object, wherein at least one of the similarity measures indicates similarity between a shape of the real-world object and the shape of the graphical silhouette object;

transmitting by the computing system to the computing device match data that is based on the one or more similarity measures; and causing the graphical display to display a match indication based on the one or more similarity measure.

12. The method of claim 11, wherein the graphical silhouette object further comprises a size, and wherein one of the similarity measures indicates similarity between a size of the real-world object and the size of the graphical silhouette object and between the shape of the real-world object and the shape of the graphical silhouette object.

13. The method of claim 11, wherein the graphical silhouette object further comprises a color of the graphical silhouette object, and wherein one of the similarity measures indicates similarity between a color of the real-world object and the color of the graphical silhouette object.

14. The method of claim 11, wherein the silhouette object further comprises a pattern of the graphical silhouette object, and wherein one of the similarity measures indicates similarity between a pattern of the real-world object and the pattern of the graphical silhouette object.

15. The method of claim 11, wherein determining the one or more similarity measures that indicate similarity between the real-world object and the graphical silhouette object comprises determining the shape of the real-world object.

16. The method of claim 15, wherein determining the one or more similarity measures that indicate similarity between the real-world object and the graphical silhouette object further comprises determining that the determined shape of the real-world object is substantially similar to the shape of the graphical silhouette object.

17. A computing system comprising:

a network interface, wherein the network interface communicatively couples the computing system to a computing device having a camera and a graphical display, wherein the graphical display of the computing device provides a field of view of an environment;

a non-transitory computer-readable medium; and program instructions stored on the non-transitory computer-readable medium and executable by the at least one processor to cause the computing system to initiate a game application and during gameplay of the game application, to:

transmit silhouette data to the computing device, wherein the silhouette data indicates a graphical silhouette object having a shape;

receive image data of an environment captured by the camera of the computing device;

receive input data generated at the computing device that indicates a desired alignment, in the field of view provided by the graphical display, of the graphical silhouette object and a real-world object in the environment;

responsive to the input data indicating the desired alignment: (a) analyze the image data of the environment to detect the real-world object in a portion of image data corresponding to the input data, and (b) determine one or more similarity measures that indicate similarity between the real-world object and the graphical silhouette object, wherein at least one of the similarity measures indicates similarity between a shape of the real-world object and the shape of the graphical silhouette object;

transmit match data to the computing device that is based on the one or more similarity measures; and cause the graphical display to display a match indication based on the one or more similarity measure.

18. The method of claim 17, wherein the graphical silhouette object further comprises a size, and wherein one of the similarity measures indicates similarity between a size of the real-world object and the size of the graphical silhouette object and between the shape of the real-world object and the shape of the graphical silhouette object.

19. The method of claim 17, wherein the graphical silhouette object further comprises a color of the graphical silhouette object, and wherein one of the similarity measures indicates similarity between a color of the real-world object and the color of the graphical silhouette object.

20. The method of claim 17, wherein the silhouette object further comprises a pattern of the graphical silhouette object, and wherein one of the similarity measures indicates similarity between a pattern of the real-world object and the pattern of the graphical silhouette object.

* * * * *